US007864991B2

(12) United States Patent
Espenlaub et al.

(10) Patent No.: US 7,864,991 B2
(45) Date of Patent: Jan. 4, 2011

(54) SYSTEM AND METHOD FOR ASSISTING A VISUALLY IMPAIRED INDIVIDUAL

(75) Inventors: David E. Espenlaub, Dallas, TX (US); Robert E. Nimon, Dallas, TX (US)

(73) Assignee: ESPRE Solutions Inc., Dallas, TX (US)

( * ) Notice: Subject to any disclaimer, the term of this patent is extended or adjusted under 35 U.S.C. 154(b) by 942 days.

(21) Appl. No.: 11/697,666

(22) Filed: Apr. 6, 2007

(65) Prior Publication Data
US 2007/0238074 A1    Oct. 11, 2007

Related U.S. Application Data

(60) Provisional application No. 60/744,389, filed on Apr. 6, 2006.

(51) Int. Cl.
*G06K 9/00* (2006.01)
(52) U.S. Cl. .................. 382/123; 382/232; 382/248; 455/557; 701/200; 701/201; 701/208; 340/539.11
(58) Field of Classification Search ............... 382/123, 382/232, 248, 250; 455/557; 701/200, 201, 701/208; 434/112; 340/995.1, 539.11; 342/357.06
See application file for complete search history.

(56) References Cited

U.S. PATENT DOCUMENTS

| 6,046,722 | A | 4/2000 | McKiel, Jr. |
| 6,774,788 | B1 | 8/2004 | Balfe |
| 6,961,458 | B2* | 11/2005 | Dutta et al. .................. 382/154 |
| 7,039,522 | B2* | 5/2006 | Landau ...................... 701/211 |
| 7,082,577 | B1 | 7/2006 | Brosnahan |
| 7,172,305 | B2 | 2/2007 | Rodriguez et al. |
| 7,325,735 | B2* | 2/2008 | Kurzweil et al. ............ 235/454 |
| 2002/0128765 | A1* | 9/2002 | Cato et al. .................. 701/200 |
| 2005/0060088 | A1* | 3/2005 | Helal et al. ................. 701/208 |
| 2005/0106536 | A1* | 5/2005 | Liebermann ................ 434/112 |

OTHER PUBLICATIONS

Lacey et al., "Adaptive Control of a Mobile Robot for the Frail Visually Impaired", 1999, International Conference on Rehabilitation Robotics, Stanford, CA.

* cited by examiner

*Primary Examiner*—Samir A. Ahmed
*Assistant Examiner*—Ali Bayat
(74) *Attorney, Agent, or Firm*—Scott T. Griggs; Griggs Bergen LLP

(57) ABSTRACT

A system and method for assisting a visually impaired individual are disclosed. In one embodiment, when the visually impaired individual encounters a situation with an obstacle, the visually impaired individual employs a first wireless device to transfer audiovisual information about the situation to an assistant with a second wireless device. The assistant analyzes the rendered audiovisual information and provides audio information to the visually impaired individual which presents a solution to the obstacle.

12 Claims, 3 Drawing Sheets

US 7,864,991 B2

SYSTEM AND METHOD FOR ASSISTING A VISUALLY IMPAIRED INDIVIDUAL

PRIORITY STATEMENT & CROSS-REFERENCE TO RELATED APPLICATIONS

This application claims priority from co-pending U.S. patent application Ser. No. 60/744,389, entitled "System and Method for Substantially Real Time Wireless Communication" and filed on Apr. 6, 2006, in the name of David E. Espenlaub; which is hereby incorporated by reference for all purposes.

TECHNICAL FIELD OF THE INVENTION

This invention relates, in general, to adaptive technologies for visually impaired and blind individuals and, in particular, to a system and method for assisting a visually impaired individual that utilizes a wireless device to enable the visually impaired individual to complete daily activities utilizing their remaining senses.

BACKGROUND OF THE INVENTION

Visual impairment, compromised vision, and blindness may be a result of disease, genetic abnormalities, injuries, or age, for example. Visually impaired individuals (including those individuals with compromised vision and blindness) often use tactile or auditory feedback methods for navigating movement within small confines as well as in open and less familiar spaces. Adaptive technologies assist the visually impaired individual in completing daily activities, such as navigating movement, utilizing their remaining senses. Existing electronic navigational adaptive technologies rely on visual cues which are often unfamiliar and may be misinterpreted by the electronic navigational device. Accordingly, there is a need for new and improved adaptive technologies.

SUMMARY OF THE INVENTION

A system and method for assisting a visually impaired individual are disclosed. In one embodiment, when the visually impaired individual encounters a situation with an obstacle, the visually impaired individual employs a first wireless device to transfer audiovisual information about the situation to an assistant with a second wireless device. The assistant analyzes the rendered audiovisual information and provides audio information to the visually impaired individual which presents a solution to the obstacle. Utilizing this system and method, the assistant may be a remotely-located, non-specialist without occupational devotion to assisting visually impaired individuals. Further, the assistance does not have to be prearranged and the assistant is not required to be located at a special service center or within any proximity to the visually impaired individual.

BRIEF DESCRIPTION OF THE DRAWINGS

For a more complete understanding of the features and advantages of the present invention, reference is now made to the detailed description of the invention along with the accompanying figures in which corresponding numerals in the different figures refer to corresponding parts and in which.

DETAILED DESCRIPTION OF THE INVENTION

While the making and using of various embodiments of the present invention are discussed in detail below, it should be appreciated that the present invention provides many applicable inventive concepts which can be embodied in a wide variety of specific contexts. The specific embodiments discussed herein are merely illustrative of specific ways to make and use the invention, and do not delimit the scope of the present invention.

Figure 1:
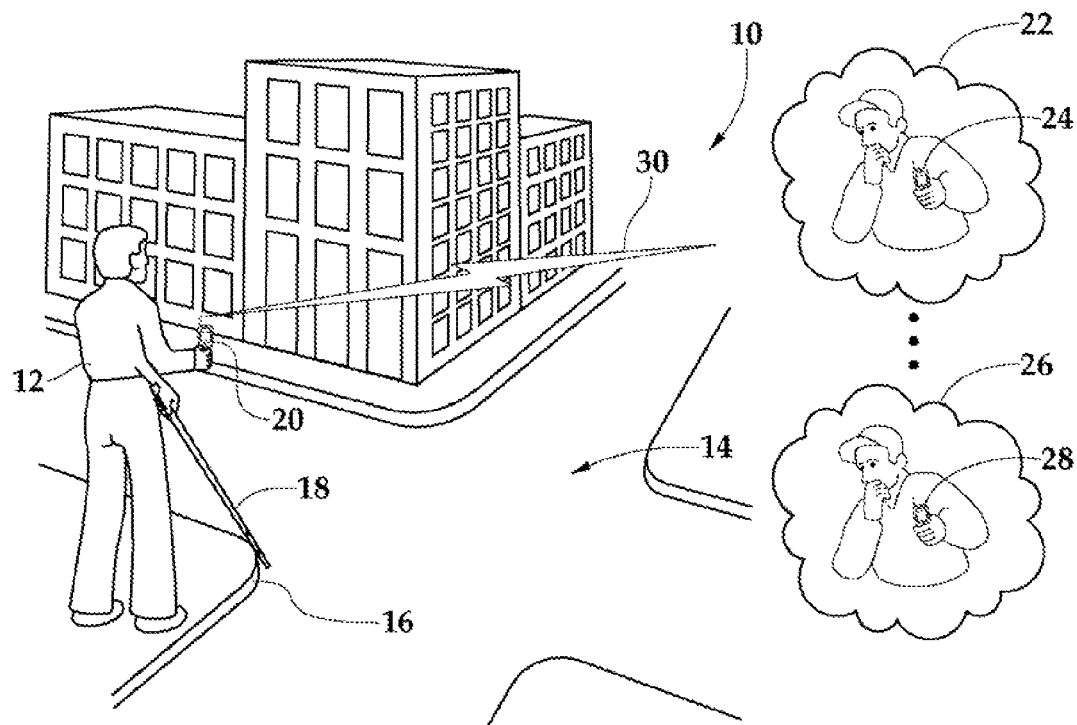
FIG. 1 is a schematic diagram of one embodiment of a system for assisting a visually impaired individual.

Referring initially to FIG. 1, therein is depicted one embodiment of a system 10 for assisting a visually impaired individual 12 when a situation 14 is encountered having an obstacle 16. As depicted, the situation 14 is an unfamiliar intersection and the obstacle 16 is crossing the unfamiliar intersection. It should be appreciated, however, that the situation 14 and obstacle 16 may be any hindrance or impediment that interferes, restricts, or prevents action by the visually impaired individual.

A long white cane 18, the international symbol of blindness, is employed by the visually impaired individual 12 to extend the range of touch sensation of the individual. Swung in a low sweeping motion across the intended path of travel, the long white cane 18 enables the visually impaired individual to detect obstacles. It should be appreciated that although a long white cane 18 is depicted, the visually impaired individual 12 may employ other adaptive technologies, such as a lighter identification cane, support cane, or guide dog, for example, to assist in navigation.

With respect to the particular situation 14 and unfamiliar intersection, the long white cane 18 is an insufficient adaptive technology for the visually impaired individual 12 to negotiate or navigate the obstacle 16. Similarly, existing electronic navigational adaptive technologies are also inadequate for negotiating the obstacle 16 as these adaptive technologies rely on visual cues of an unfamiliar intersection and are misinterpreted by the electronic navigational device. To navigate the obstacle 16, the visually impaired individual 12 employs a wireless device 20 to transfer audiovisual information about the situation 14 to a potential assistant 22 with a wireless device 24 or, alternatively, if the potential assistant 22 is not available to another potential assistant, such as potential assistant 26 with a wireless device 28. The potential assistants 22, 26 may be remotely located to the visually impaired individual 12 and a prearrangement of assistance is not required, i.e., the assistance may be substantially spontaneous. By way of example, once a communication circuit is established between the wireless devices 20 and 24 of the visually impaired individual 12 and the assistant 22, respectively, as represented by communication signal 30, the visually impaired individual 12 transfers audiovisual information about the situation 14 and the obstacle 16 to the assistant 22. The assistant 22 is then able to analyze the transferred information and provide audio information to the visually impaired individual 12 which presents a solution to the obstacle 16. In one implementation, substantially realtime, continuous video communication is provided by the wireless device 20 of the visually impaired individual 12 to the wireless device 24 of the assistant 22. Accordingly, the sited assistant 22 is provided with realtime, continuous video images as a basis for visual interpretation and analysis of the situation 14. Person-to-person or personalized navigational assistance, which may be remote and substantially spontaneous, is thereby provided over a wireless network.

By utilizing wireless devices belonging to the visually impaired individual 12 and any potential assistant, the teachings presented herein enable a visually impaired individual 12 to receive assistance without the need for a call center or other type of assistance center that may require a membership, a fee, or may be insufficiently staffed. Accordingly, the assistant may be a non-specialist without occupational devotion to assisting visually impaired individuals. By way of example, the assistant may be a friend, co-worker, acquaintance, or family member providing substantially spontaneous assistance while being engaged in day-to-day activities prior to the communication from the visually impaired individual. The assistant may be providing the assistance remotely to the visually impaired individual and away from any call center or other specialized support facility whether or not the assistance was prearranged. Further, in embodiments where wireless devices such as cellular telephones are used, the assistance does not have to be prearranged and the assistant is not required to be located at a special service center. Although in the illustrated embodiment, the assistant is not located at a call center or service center, it should be appreciated that such an application is within the teachings presented herein.

Figure 2:
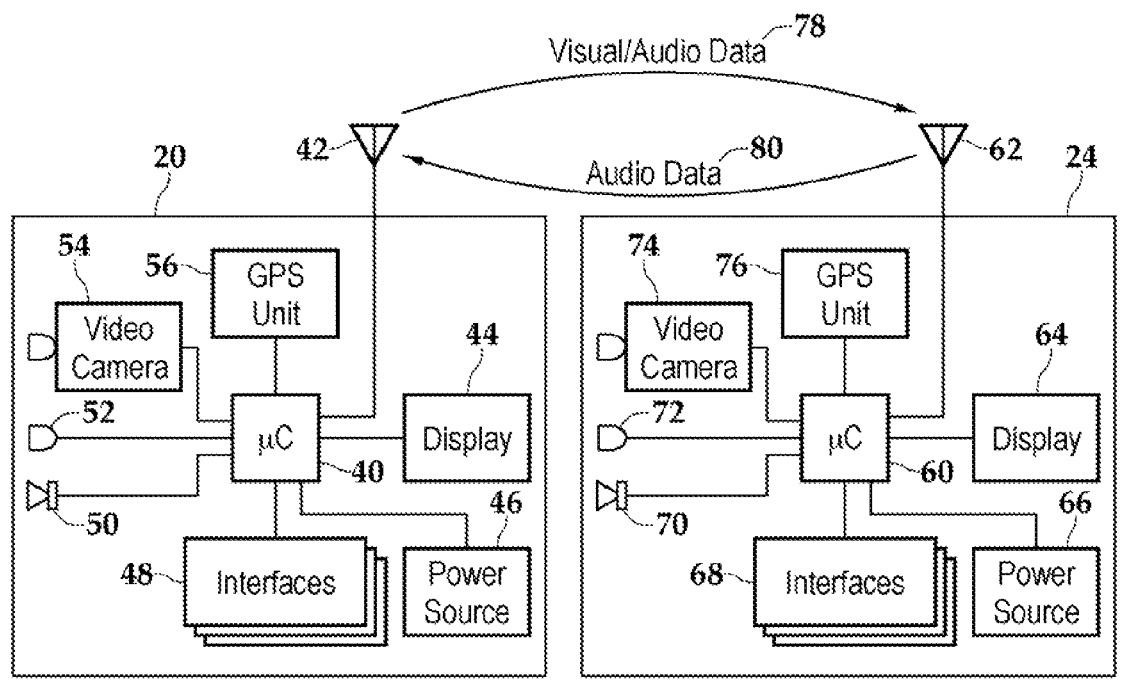
FIG. 2 is a functional block diagram depicting one embodiment of the adaptive technology of FIG. 1 in further detail.

FIG. 2 depicts one embodiment of the adaptive technology of FIG. 1 in further detail. The wireless device 20 may include a microcontroller (or microprocessor) 40, an antenna 42, a display 44, a power source 46, interfaces 48 such as a Bluetooth® interface or USB port, a speaker 50, a microphone 52, a video camera 54, and a GPS unit 56. Likewise, the wireless device 24 may include a microcontroller 60, an antenna 62, a display 64, a power source 66, interfaces 68, a speaker 70, a microphone 72, a video camera 74, and a GPS unit 76. Each of the wireless devices 20 and 24 may include cellular telephones, personal digital assistants (PDAs) or other electronic communication devices, for example, that permit communication between two individuals. By way of further example, each wireless device may be a wireless, high resolution video and audio collaboration device that is specialized to transmit video and audio content between the visually impaired individual and the assistant.

Additionally, although particular architectures are illustrated for each wireless device, it should be appreciated that each wireless device may comprise any architecture having any combination of hardware, software, and firmware. Moreover, it should be appreciated that the wireless device 20 does not require a display 44, interfaces 48, or a GPS unit 56, for example. Similarly, the wireless device 24 does not require interfaces 68, the video camera 74, or the GPS unit 76. In particular, in one implementation, the wireless device 24 only requires the display 64, the speaker 70, and the microphone 72. Further, a wired-device, which would not include the antenna 62, such as a computer connected to the Internet, for example, may be utilized instead of the wireless device 24. The wired-device embodiment is particularly appropriate for a call center service embodiment, whether subscription-based or a free public service, having ready occupational professionals to assist the visually impaired individual.

In operation, a wireless network provides for communication between the wireless devices 20 and 24. The wireless network may be a telecommunications network, cellular network, or a Wi-Fi network, for example, and may vary in accordance with the selected wireless devices. The wireless devices enable the transmission of audiovisual data from the wireless device 20 to the wireless device 24 and the transmission of audio data from the wireless device 24 to the wireless device 20. In one embodiment, to enable the receipt and rendering of high quality video and audio at wireless device 24, at least a portion of the transmitted data is compressed and later decompressed by a compression scheme. The video camera 54 may be a high resolution, auto focus camera with a software application that includes features to enable the encoding, compression, and transmission of the video from the wireless device 20 to the wireless device 24 over the selected communication channel. The compression algorithms may be efficient and provide for the use of the available bandwidth during the communication without compromising the quality of the video images. Similarly, the wireless device 24 includes software for efficiently decoding, decompressing, and rendering the received video images, which may comprise, over a period of time, substantially realtime, continuous video.

In one implementation, the wireless device 20 captures video images at video camera 54 and compresses the video images at microcontroller 40 via a software application installed therein prior to transmitting the video to wireless device 24. In another implementation, audiovisual data is captured by the video camera 54 and microphone 52 and both are compressed prior to transmission as represented by number 78. Once the data is received at wireless device 24, the data is appropriately decompressed by a software package installed on the microcontroller 60. The video images may then be displayed on the display 64 and the audio rendered by the speaker 70. In response to the received communication, the wireless device 24 may capture audio at the microphone 72 and send, as indicated by number 80, the captured audio to the wireless device 20 for rendering by speaker 50. The audio captured by the wireless device 24 may or may not be compressed and decompressed.

Figure 3:
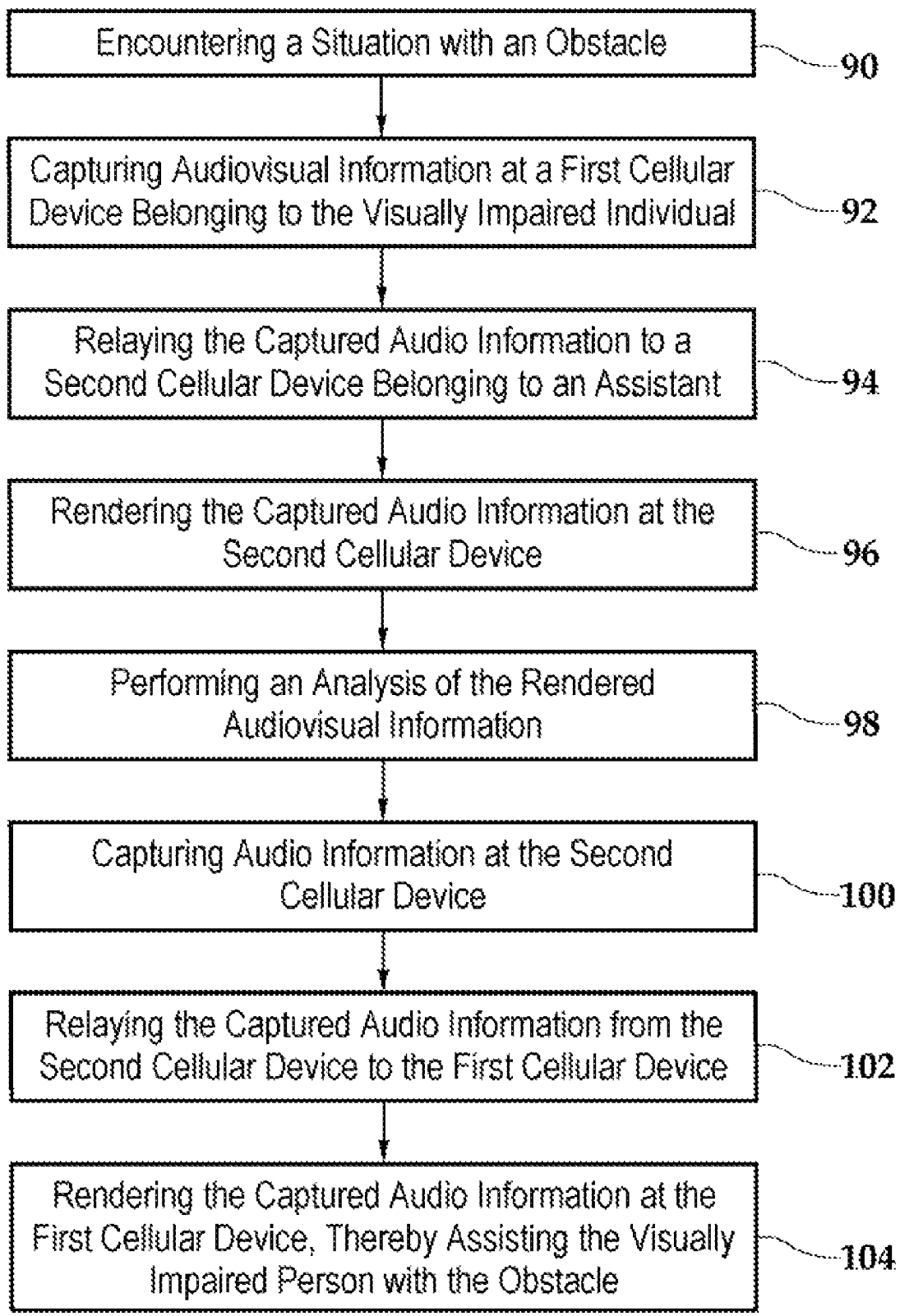
FIG. 3 is a flow chart depicting one embodiment of a method for assisting a visually impaired individual.

FIG. 3 depicts one embodiment of a method for assisting a visually impaired individual. At block 90, the visually impaired individual encounters a situation with an obstacle. At block 92, the visually impaired individual's wireless device is utilized to capture audiovisual information relating to the situation and the obstacle. At this time, the audiovisual information, or the visual component of the audiovisual information, may be encoded and/or compressed. At block 94, the captured audiovisual information is relayed to a wireless device belonging to an assistant. Furthermore at blocks 92 and 94, the GPS coordinates of the visually impaired individual may be read by a GPS unit integrated with the wireless device and transmitted with or at substantially the same time as the captured audiovisual information. It should be understood that the GPS coordinates may be utilized by the assistant to locate the location of the visually impaired individual and therefore provide information to the visually impaired individual which is based on additional data. Once received, the encoded, compressed components of the captured audiovisual information may be decoded and decompressed.

At block 96, the captured audiovisual information is rendered at the wireless device belonging to the assistant. At block 98, the assistant analyzes the rendered audiovisual information and provides information in the form of an audible response which is captured as audio information at block 100. At block 102, the captured audio information is relayed from the wireless device of the assistant to the wireless device of the visually impaired individual. At block 104, the audio information is rendered and the assistant's analysis assists the visually impaired person with overcoming the obstacle in the situation.

Figure 4:
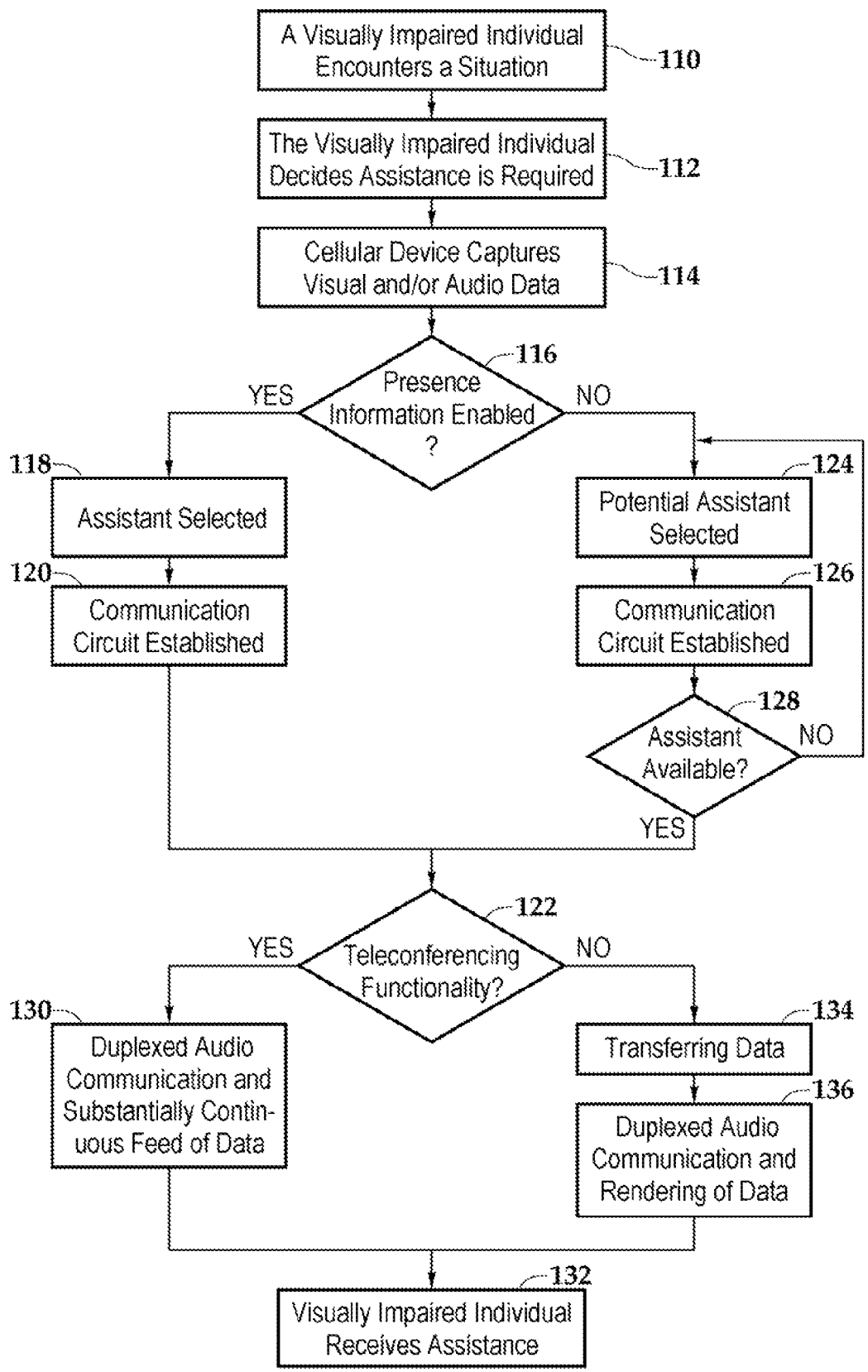
FIG. 4 is a flow chart depicting another embodiment of a method for assisting a visually impaired individual.

FIG. 4 depicts another embodiment of a method for assisting a visually impaired individual. At block 110, a visually impaired individual encounters a situation having an obstacle. The visually impaired individual is unable to negotiate or navigate the obstacle utilizing existing senses and any adaptive technology. At block 112, the visually impaired individual decides third-party assistance, which may be remote and substantially spontaneous, is required via the adaptive technology discussed herein. At block 114, the visually impaired individual uses a wireless device to capture visual and audio data about the situation and obstacle.

In one implementation, the systems and methodologies presented herein include a presence information feature whereby a status indicator on the wireless device of the visually impaired individual conveys availability, ability, and willingness of a potential assistant to assist the visually impaired individual. In one operational embodiment, the functionality of the presence information is enabled by software installed on each wireless device and/or a remote server integrated with or disposed in communication with the wireless network that provides communication between the wireless devices of the visually impaired individual and the assistant. Such a service, which may incorporate a polling function that regularly updates the status of individuals, may be enabled by a Global System for Mobile Communications (GSM)—based protocol or similar wireless protocol.

Common states of an individual include "no assistance required", "assistance required", and "thank you, being assisted". Common states of the potential assistants include "free to help", "busy", and "away", for example. It should be appreciated, however, that other states are possible for both the visually impaired individual and potential assistants that support a rich choice of additional presence attributes.

Returning to decision block 116 in FIG. 4, if the presence information functionality is enabled, then the methodology advances to blocks 118 and 120 wherein an assistant is selected from a group of potential assistants and a communication circuit is established between the wireless device of the visually impaired individual and a wireless device belonging to the assistant. Once this the communication circuit is established, the method continues to decision block 122.

Returning to decision block 116, however, if the presence information feature is not implemented or not available, then the methodology continues from block 116 to block 124, wherein the visually impaired individual selects a potential assistant and, at block 126, establishes a communication circuit with the potential circuit. At decision block 128, if the potential assistant is available, then the methodology advances to decision block 122. Otherwise, the methodology returns to block 124 so that another potential assistant may be selected and contacted by the visually impaired individual. In one implementation, the enablement of presence information at decision block 116 and the associated options of blocks 118 through 120 and blocks 124 through 128 respectfully represent automated and ad hoc approaches the visually impaired individual may employ to find assistance. One embodiment of the automated approach is depicted with blocks 118 through 120. In another embodiment, the automated approach may include calling a dedicated service center or other prearranged alternative for assistance.

At decision block 122, if full teleconferencing functionality is available on the wireless device of the assistant, then the process advances to block 130 wherein duplexed audio communication is provided between the visually impaired individual and the assistant. In one implementation, the duplexed audio communication may include compression and decompression and/or encoding and decoding of the transferred data. Additionally, a substantially continuous feed of visual data is provided from the wireless device of the visually impaired individual to the wireless device of the assistant. With two-way audio communication enabled and the assistant receiving visual data of the visually impaired individual's environment, at block 132, the assistant is able to provide the visually impaired individual with assistance.

Returning to decision block 122, if the wireless device of the assistant is not able to receive real time video while supporting duplexed audio communication, then a video clip, which may include or comprise a still image, is transferred from the visually impaired individual to the assistant at block 134. At block 136, duplexed audio communication is provided between the visually impaired individual and the assistant. Additionally, the video clip is rendered. It should be appreciated that the rendering of the video clip may occur prior to the duplexed audio communication. Further, compression and decompression may occur as part of the transmission of the data and, in particular, the video portion of the data. Alternatively, with respect to blocks 134 and 136, the video clip may be rendered in substantially real time prior to the duplexed audio communications occurring. Once the video clip is viewed and the visually impaired individual and assistant are able to verbally communicate, as previously discussed, the visually impaired individual is assisted at block 132. It should be appreciated that the order of the methodologies presented in FIGS. 3 and 4 may vary. By way of example, the operations of block 114 may occur after the operations of blocks 116 through 128.

While this invention has been described with reference to illustrative embodiments, this description is not intended to be construed in a limiting sense. Various modifications and combinations of the illustrative embodiments as well as other embodiments of the invention, will be apparent to persons skilled in the art upon reference to the description. It is, therefore, intended that the appended claims encompass any such modifications or embodiments.

What is claimed is:

1. A method for assisting a visually impaired individual, the method comprising:

encountering a situation with an obstacle;

capturing audiovisual information at a first wireless device belonging to the visually impaired individual, the audiovisual information relating to the situation;

relaying the captured audiovisual information from the first wireless device to a second wireless device belonging to an assistant, the assistant being a non-specialist without occupational devotion to assisting visually impaired individuals;

rendering the captured audiovisual information at the second wireless device;

performing an analysis of the rendered audiovisual information;

capturing audio information at the second wireless device, the audio information relating to a solution to the obstacle;

relaying the captured audio information from the second wireless device to the first wireless device; and rendering the captured audio information at the first wireless device, thereby assisting the visually impaired person with the obstacle.

2. The method as recited in claim 1, further comprising:

compressing the captured audiovisual information at the first wireless device prior to relaying the captured audiovisual information; and decompressing the compressed audiovisual information at the second wireless device after receiving the compressed audiovisual information at the second wireless device.

3. The method as recited in claim 1, wherein relaying the captured audiovisual information further comprises utilizing a wireless network for the relay.

4. A method for assisting a visually impaired individual, the method comprising:
   encountering a situation with an obstacle;
   monitoring presence information of a plurality of potential assistants, each of the plurality of assistants being a non-specialist without occupational devotion to assisting visually impaired individuals;
   selecting one of the plurality of potential assistants to call based on the presence information;
   establishing a communication circuit between a first wireless device associated with the visually impaired individual and a second wireless device associated with the selected assistant;
   transmitting a substantially continuous, realtime visual feed from the first wireless device to the second wireless device; and
   duplexing audio communication between the first wireless device and the second wireless device, the audio communication including a verbal solution to overcoming the obstacle.

5. The method as recited in claim 4, further comprising:
   compressing the substantially continuous, realtime visual feed prior to transmission from the first wireless device; and
   decompressing the substantially continuous, realtime visual feed at the second wireless device.

6. The method as recited in claim 4, wherein transmitting the substantially continuous, realtime visual feed further comprises utilizing a cellular network.

7. The method as recited in claim 4, wherein monitoring presence information further comprises analyzing the availability, ability, and willingness of each of the plurality of potential assistants to assist the visually impaired individual.

8. A system for assisting a visually impaired individual, the system comprising:
   a first wireless device for polling a plurality of potential assistants in response to encountering an obstacle in a situation, each of the plurality of potential assistants being a non-specialist without occupational devotion to assisting visually impaired individuals;
   means for determining availability status of the plurality of potential assistants;
   means for selecting one of the plurality of potential assistants to call;
   means for establishing a communication circuit between the first wireless device associated with the visually impaired individual and a second wireless device associated with the selected assistant;
   means for sending a substantially continuous, realtime visual feed from the first wireless device to the second wireless device; and
   means for duplexing audio communication between the first wireless device and the second wireless device, the audio communication including a verbal solution to overcoming the obstacle.

9. The system as recited in claim 8, further comprising a cellular network for enabling communication between the first wireless device and the second wireless device.

10. The system as recited in claim 8, wherein the first wireless device further comprises a cellular telephone.

11. The system as recited in claim 8, further comprising:
   means for compressing the substantially continuous, realtime visual feed at the first wireless device; and
   means for decompressing the compressed substantially continuous visual feed at the second wireless device.

12. The system as recited in claim 8, wherein the first wireless device is at least partially integrated with a component selected from the group consisting of the means for determining availability, the means for establishing a communication circuit, the means for sending a substantially continuous, realtime visual feed, and means for duplexing audio communication.

* * * * *